(12) United States Patent
Zhou et al.

(10) Patent No.: US 11,179,834 B2
(45) Date of Patent: Nov. 23, 2021

(54) ELASTIC SEALING RING EXPANDING APPARATUS

(71) Applicants: Tyco Electronics (Shanghai) Co. Ltd., Shanghai (CN); TE Connectivity Corporation, Berwyn, PA (US); Suzhou Harmontronics Automation Technology Co., Ltd., Suzhou (CN)

(72) Inventors: Lei Zhou, Shanghai (CN); Dandan Zhang, Shanghai (CN); Lvhai Hu, Shanghai (CN); Roberto Francisco-Yi Lu, Bellevue, WA (US); Huiyou Zhou, Suzhou (CN)

(73) Assignees: Tyco Electronics (Shanghai) Co. Ltd., Shanghai (CN); TE Connectivity Corporation, Berwyn, PA (US); Suzhou Harmontronics Automation Technology Co. Ltd., Suzhou (CN)

( * ) Notice: Subject to any disclaimer, the term of this patent is extended or adjusted under 35 U.S.C. 154(b) by 87 days.

(21) Appl. No.: 16/704,534

(22) Filed: Dec. 5, 2019

(65) Prior Publication Data
US 2020/0108491 A1    Apr. 9, 2020

Related U.S. Application Data

(63) Continuation of application No. PCT/EP2018/064872, filed on Jun. 6, 2018.

(30) Foreign Application Priority Data

Jun. 6, 2017 (CN) .......................... 201710418172.4

(51) Int. Cl.
| B23P 19/00 | (2006.01) |
| B25B 27/00 | (2006.01) |
| B23P 19/08 | (2006.01) |

(52) U.S. Cl.
CPC ........ *B25B 27/0028* (2013.01); *B23P 19/084* (2013.01)

(58) Field of Classification Search
CPC .... B25B 1/00; B25B 1/08; B25B 1/22; B25B 1/2473; B23P 19/00; B23P 19/04; B23P 19/08; B23P 19/084; B23Q 3/00; B23Q 3/06; B23Q 3/154
See application file for complete search history.

(56) References Cited

U.S. PATENT DOCUMENTS 4,790,695 A * 12/1988 Abernethy .............. B23B 47/28
269/87.3
6,000,688 A * 12/1999 Giangrasso ............ B23Q 3/104
269/252

(Continued)

*Primary Examiner* — Lee D Wilson
(74) *Attorney, Agent, or Firm* — Barley Snyder

(57) ABSTRACT

An elastic sealing ring expanding apparatus includes a base on which a plurality of posts are disposed, an assembly platform supported on the base by the posts, a plurality of rods movably mounted on the assembly platform, and a driving device mounted on the base. The driving device is configured to drive the rods to move from a center of a rectangle toward a plurality of corners of the rectangle along a plurality of straight paths, expanding an elastic sealing ring sleeved on the rods into a rectangular ring with a predetermined length-width ratio.

20 Claims, 4 Drawing Sheets

(56) References Cited

U.S. PATENT DOCUMENTS 6,254,077 B1 *  7/2001  Riley, Jr. .................. B25B 5/10
                                                    269/156
6,554,265 B2 *  4/2003  Andronica ............ B25B 1/2452
                                                    269/268

* cited by examiner they can be embodied in many different forms and should not be construed as
ELASTIC SEALING RING EXPANDING APPARATUS

CROSS-REFERENCE TO RELATED APPLICATIONS

This application is a continuation of PCT International Application No. PCT/EP2018/064872, filed on Jun. 6, 2018, which claims priority under 35 U.S.C. § 119 to Chinese Patent Application No. 201710418172.4, filed on Jun. 6, 2017.

FIELD OF THE INVENTION

The present invention relates to an elastic sealing ring expanding apparatus and, more particularly, to an elastic sealing ring expanding apparatus adapted to expand an elastic sealing ring into a rectangular ring with a predetermined length-width ratio.

BACKGROUND

In order to fit an elastic sealing ring in a rectangular groove in a component to be sealed, it is sometimes necessary to expand the elastic sealing ring into a rectangular ring with a predetermined length-width ratio. The elastic sealing ring is generally expanded manually. During installation of the elastic sealing ring, a worker needs to pull the elastic sealing ring outward with four fingers to expand the elastic sealing ring. Then, the expanded elastic sealing ring is sleeved onto the component and fit into the rectangular groove. However, manually expanding the elastic sealing ring is very time-consuming and inefficient, which increases the assembly cost thereof.

SUMMARY

An elastic sealing ring expanding apparatus includes a base on which a plurality of posts are disposed, an assembly platform supported on the base by the posts, a plurality of rods movably mounted on the assembly platform, and a driving device mounted on the base. The driving device is configured to drive the rods to move from a center of a rectangle toward a plurality of corners of the rectangle along a plurality of straight paths, expanding an elastic sealing ring sleeved on the rods into a rectangular ring with a predetermined length-width ratio.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
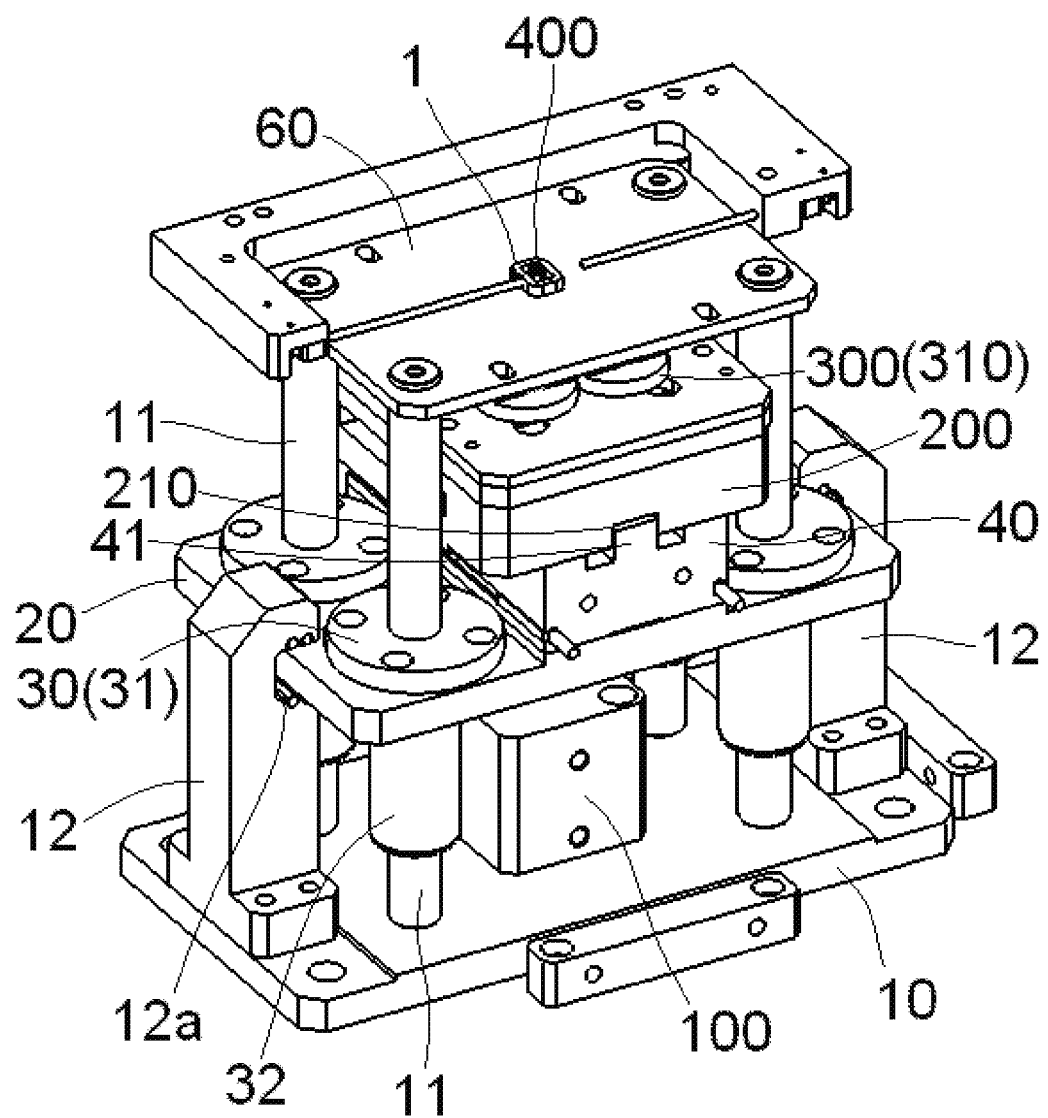
FIG. 1 is a perspective view of an elastic sealing ring expanding apparatus according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An elastic sealing ring expanding apparatus according to an embodiment, as shown in FIG. 1, comprises a base 10, an assembly platform 60, four rods 400, and a driving device 100, 200, 300. A plurality of posts 11 are provided on the base 10. The assembly platform 60 is supported on the base 10 by the plurality of posts 11. The four rods 400 are movably mounted on the assembly platform 60. The driving device 100, 200, 300 is mounted on the base 10 and configured to drive the four rods 400 to move.

Figure 2:
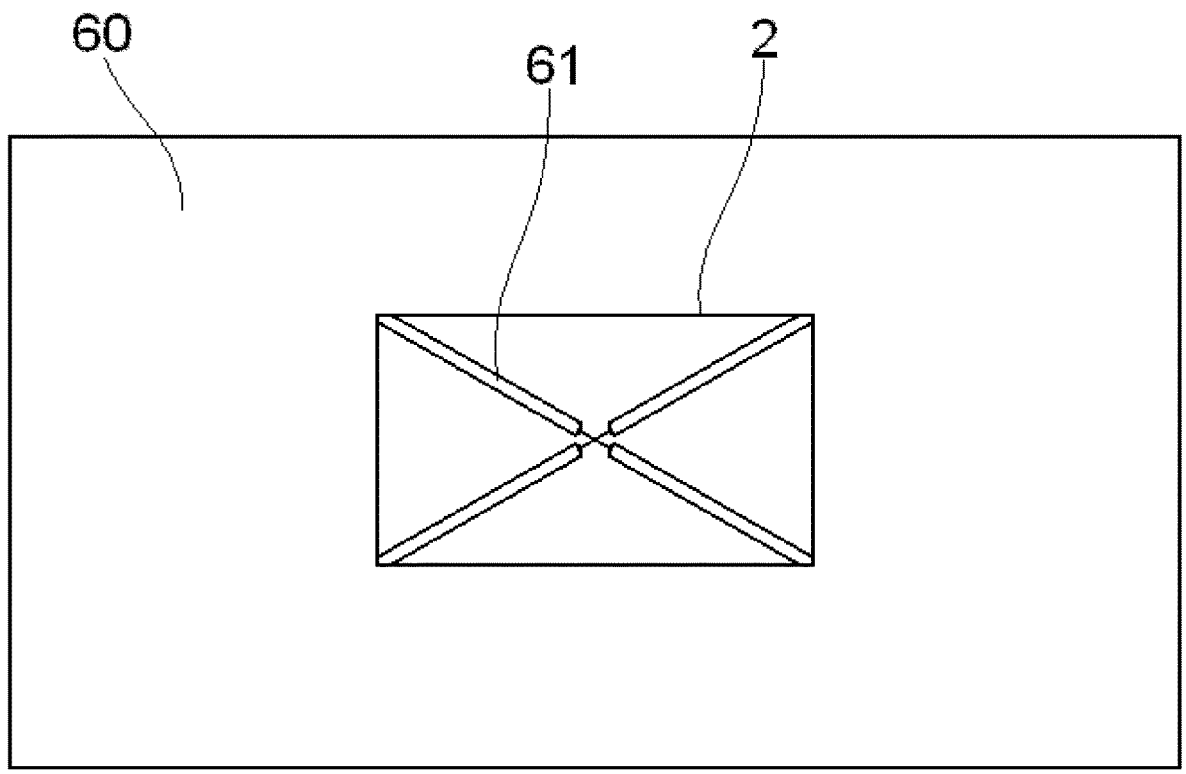
FIG. 2 is a plan view of an assembly platform of the elastic sealing ring expanding apparatus.
Figure 3:
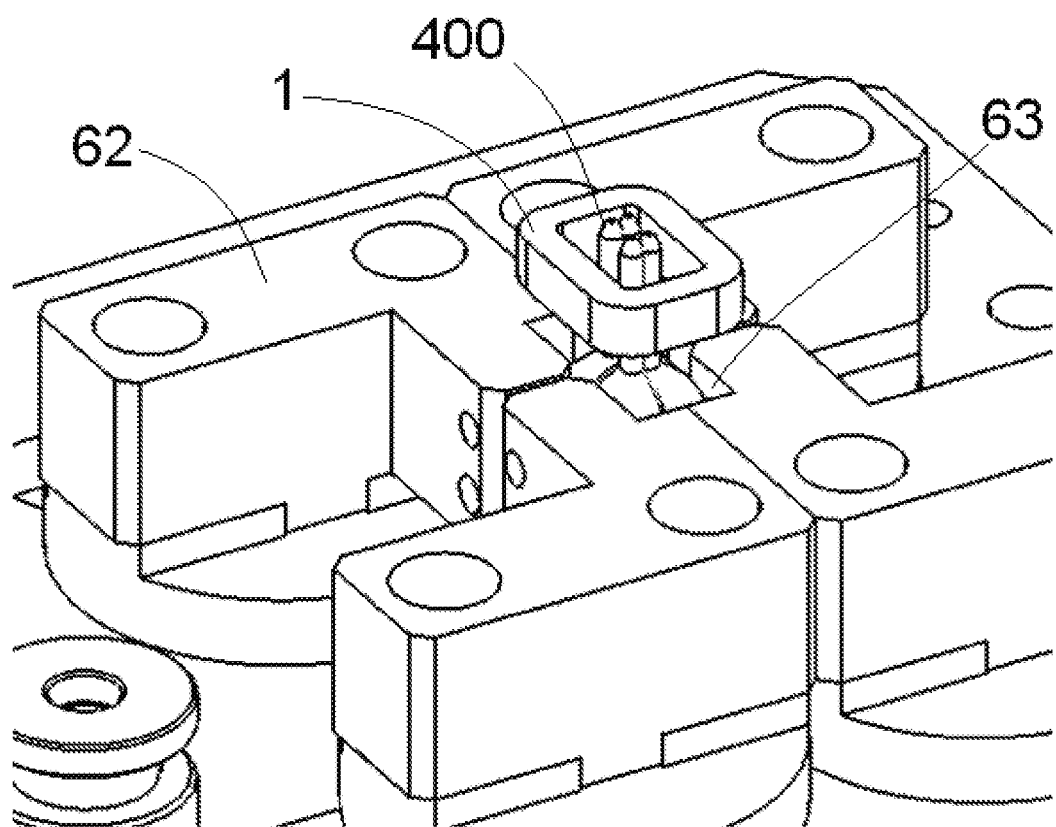
FIG. 3 is a perspective view of an initial state of an elastic sealing ring when it has not been expanded by the elastic sealing ring expanding apparatus.
Figure 4:
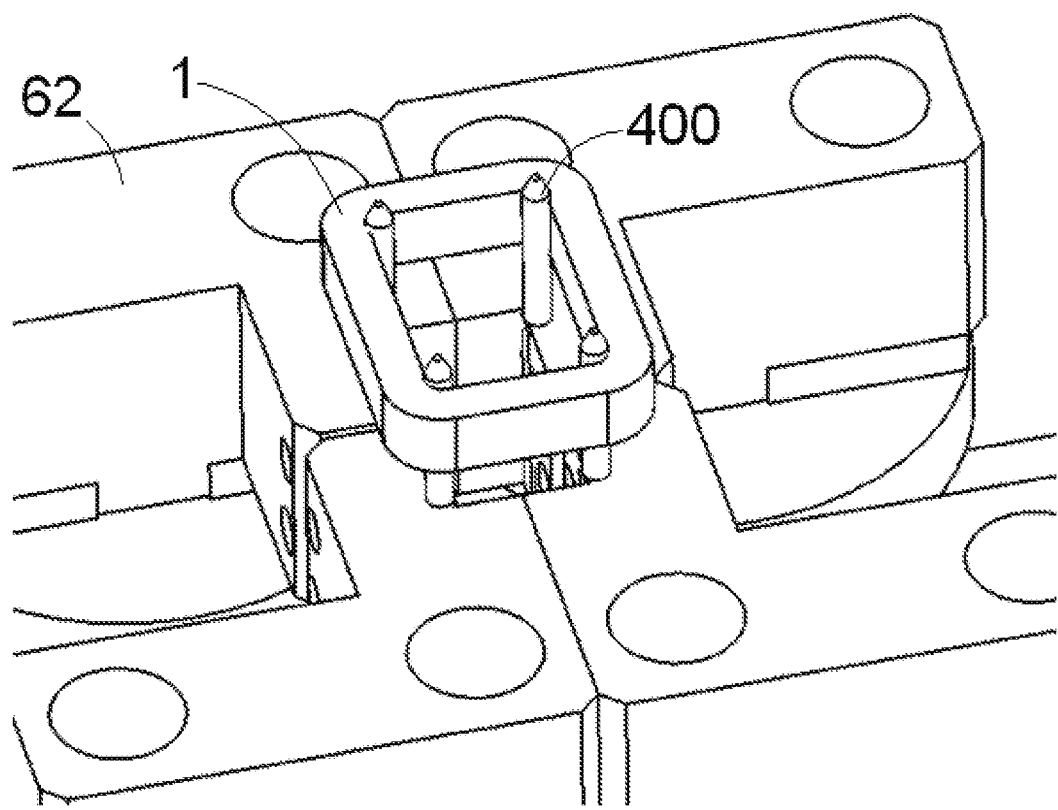
FIG. 4 is a perspective view of an expanded state of the elastic sealing ring when it has been expanded by the elastic sealing ring expanding apparatus.

As shown in FIGS. 1-4, the four rods 400 are adapted to be driven by the driving device 100, 200, 300 to move from a center of a rectangle 2 toward four corners of the rectangle 2 along respective straight paths, for example, the four straight paths defined by four slots 61 in FIG. 2, respectively, so as to expand the elastic sealing ring 1 sleeved on the four rods 400, as shown in FIG. 3, into a rectangular ring with a predetermined length-width ratio, as shown in FIG. 4. The elastic sealing ring expanding apparatus may efficiently expand an elastic sealing ring 1 into a rectangular ring with a predetermined length-width ratio, which improves the elastic sealing ring 1 expanding efficiency, and reduces the assembly cost.

As shown in FIG. 2, four slots 61 are formed in the assembly platform 60. A first end of each of the four slots 61 points to the center of the rectangle 2, a second end of each of the four slots 61 points to a corresponding one of four corners of the rectangle 2. The four rods 400 are slidably mounted in the four slots 61, respectively, and the driving device 100, 200, 300 is adapted to drive the four rods 400 to move in the four slots 61, respectively.

As shown in FIGS. 3 and 4, a frame 62 is mounted on the assembly platform 60. The frame 62 is arranged to define a rectangular space 63 with the predetermined length-width ratio. The four rods 400 are moved by the driving device 100, 200, 300 from a center of the rectangular space 63 to four corners of the rectangular space 63 along respective straight paths, respectively, and are respectively blocked and stopped at the four corners of the rectangular space 63.

The driving device 100, 200, 300, shown in FIG. 1, is configured to drive the four rods 400 to synchronously move. The driving device 100, 200, 300 includes four cam mechanisms 300 and a driving motor 100 constructed to drive the four cam mechanisms 300 to rotate. Each cam mechanism 300 is adapted to transfer a driving force from the driving motor 100 to the respective rod 400, and each cam mechanism 300 is adapted to convert a rotation motion of the driving motor 100 into a linear motion, so as to drive the four rods 400 to move along respective straight paths.

As shown in FIG. 1, each cam mechanism 300 has a cam 310 and at least two transmission gears arranged between a drive shaft of the cam 310 and an output shaft of the driving motor 100. The transmission gears of the four cam mechanisms 300 are received in a gear box 200, and the cams 310 of the four cam mechanisms 300 are provided outside the gear box 200. When the cams 310 of the four cam mechanisms 300 are rotated, the cams 310 may drive the four rods 400 to move along respective straight paths.

The elastic sealing ring expanding apparatus, as shown in FIG. 1, includes a support table 20. The support table 20 is supported on the base 10 by a plurality of brackets 12 provided on the base 10. The support table 20 is located below the assembly platform 60, and the gear box 200 is mounted on the support table 20. The driving motor 100 is mounted on the base 10 and located below the support table 20.

As shown in FIG. 1, a seat 40 is provided on the support table 20, and the gear box 200 is detachably mounted on the seat 40. A dove-tail slot 210 is formed in one of the gear box 200 and the seat 40, a dove-tail bar 41 is formed on the other of the gear box 200 and the seat 40. The dove-tail bar 41 is slidably engaged into the dove-tail slot 210, so as to detachably mount the gear box 200 on the seat 40.

As shown in FIG. 1, a notch 12a is formed in each bracket 12. Side edges of the support table 20 are fitted and supported in the notches 12a of the brackets 12, so as to support the support table 20 on the brackets 12.

As shown in FIG. 1, a plurality of flanges 30 are mounted on the support table 20, and the plurality of posts 11 pass through the plurality of flanges 30. The flange 30 is configured to enhance a structural strength of the post 11 to prevent the post 11 from being bent. The flanges 30 each have a disk portion 31 and a cylindrical portion 32 connected to the disk portion 31. The disk portion 31 is fixed to the support table 20, and the post 11 passes through the disk portion 31 and the cylindrical portion 32 in an axial direction of the flange.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An elastic sealing ring expanding apparatus, comprising:
   a base on which a plurality of posts are disposed;
   an assembly platform supported on the base by the posts,
   a plurality of rods movably mounted on the assembly platform; and
   a driving device mounted on the base and configured to drive the rods to move from a center of a rectangle toward a plurality of corners of the rectangle along a plurality of straight paths, expanding an elastic sealing ring sleeved on the rods into a rectangular ring with a predetermined length-width ratio.

2. The elastic sealing ring expanding apparatus of claim 1, wherein the plurality of rods include four rods.

3. The elastic sealing ring expanding apparatus of claim 1, wherein the assembly platform has a plurality of slots, a first end of each of the slots points to a center of the rectangle and a second end of each of the slots points to one of a plurality of corners of the rectangle.

4. The elastic sealing ring expanding apparatus of claim 3, wherein the rods are slidably mounted in the slots and the driving device drives the rods to move in the slots.

5. The elastic sealing ring expanding apparatus of claim 1, wherein a frame mounted on the assembly platform defines a rectangular space with the predetermine length-width ratio, the rods are moved by the driving device from a center of the rectangular space to a plurality of corners of the rectangular space along the straight paths and are blocked and stopped at the corners of the rectangular space.

6. The elastic sealing ring expanding apparatus of claim 1, wherein the driving device drives the rods to synchronously move.

7. The elastic sealing ring expanding apparatus of claim 1, wherein the driving device includes a driving motor and a plurality of cam mechanisms each adapted to transfer a driving force from the driving motor to one of the rods and convert a rotation motion of the driving motor into a linear motion to drive the rods to move along the straight paths.

8. The elastic sealing ring expanding apparatus of claim 7, wherein each cam mechanism has a cam and a pair of transmission gears arranged between a drive shaft of the cam and an output shaft of the driving motor.

9. The elastic sealing ring expanding apparatus of claim 8, wherein the transmission gears are received in a gear box and the cams are disposed outside the gear box.

10. The elastic sealing ring expanding apparatus of claim 9, further comprising a support table supported on the base by a plurality of brackets, the support table is located below the assembly platform and the gear box is mounted on the support table.

11. The elastic sealing ring expanding apparatus of claim 10, wherein the support table has a seat, the gear box is detachably mounted on the seat.

12. The elastic sealing ring expanding apparatus of claim 11, wherein a dove-tail slot is formed in one of the gear box and the seat, and a dove-tail bar is formed on the other of the gear box and the seat, the dove-tail bar slidably engaging the dove-tail slot to detachably mount the gear box on the seat.

13. The elastic sealing ring expanding apparatus of 10, wherein each of the brackets has a notch, a plurality of side edges of the support table are fitted and supported in the notches of the brackets.

14. The elastic sealing ring expanding apparatus of claim 13, wherein a plurality of flanges are mounted on the support table and the posts extend through the of flanges.

15. The elastic sealing ring expanding apparatus of claim 14, wherein each of the flanges has a disk portion and a cylindrical portion connected to the disk portion.

16. The elastic sealing ring expanding apparatus of claim 15, wherein the disk portion is fixed to the support table and one of the posts extends through the disk portion and the cylindrical portion in an axial direction of the flange.

17. The elastic sealing ring expanding apparatus of claim 10, wherein the driving motor is mounted on the base and located below the support table.

18. The elastic sealing ring expanding apparatus of claim 1, wherein the driving device drives the rods to move outwardly from the center of the rectangle toward the corners of the rectangle such that a distance between the axial centers of each rod is increased.

19. An elastic sealing ring expanding apparatus, comprising:
   a base on which a plurality of posts are disposed;
   an assembly platform supported on the base by the posts and having a plurality of slots, a first end of each of the slots points to a center of a rectangle and a second end of each of the slots points to one of a plurality of corners of the rectangle,
a plurality of rods movably mounted on the assembly platform; and
a driving device mounted on the base and configured to drive the rods to move from the center of the rectangle toward the plurality of corners of the rectangle along a plurality of straight paths, expanding an elastic sealing ring sleeved on the rods into a rectangular ring with a predetermined length-width ratio.

20. An elastic sealing ring expanding apparatus, comprising:
a base on which a plurality of posts are disposed;
an assembly platform supported on the base by the posts,
a plurality of rods movably mounted on the assembly platform;
a driving device mounted on the base and configured to drive the rods to move from a center of a rectangle toward a plurality of corners of the rectangle along a plurality of straight paths, expanding an elastic sealing ring sleeved on the rods into a rectangular ring with a predetermined length-width ratio; and
a frame mounted on the assembly platform defining a rectangular space with the predetermine length-width ratio, the rods are moved by the driving device from a center of the rectangular space to a plurality of corners of the rectangular space along the straight paths and are blocked and stopped at the corners of the rectangular space.

* * * * *